(12) United States Patent
Ninh et al.

(10) Patent No.: US 9,501,197 B2
(45) Date of Patent: Nov. 22, 2016

(54) DISPLAY DEVICE

(71) Applicant: Panasonic Avionics Corporation, Lake Forest, CA (US)

(72) Inventors: Loi Quang Ninh, Irvine, CA (US); Vic Wu, Irvine, CA (US); Wenkai Hsu, Irvine, CA (US); Curtis Le, Tustin, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 15/093,645

(22) Filed: Apr. 7, 2016

(65) Prior Publication Data

US 2016/0224159 A1 Aug. 4, 2016

Related U.S. Application Data

(62) Division of application No. 14/040,384, filed on Sep. 27, 2013, now Pat. No. 9,323,093.

(60) Provisional application No. 61/718,304, filed on Oct. 25, 2012.

(51) Int. Cl.
*G02F 1/1333* (2006.01)
*G06F 3/044* (2006.01)

(52) U.S. Cl.
CPC .......... *G06F 3/044* (2013.01); *G02F 1/13338* (2013.01); *G02F 1/133308* (2013.01); *G02F 2001/133334* (2013.01); *G06F 2203/04107* (2013.01)

(58) Field of Classification Search
None
See application file for complete search history.

(56) References Cited

U.S. PATENT DOCUMENTS

| 6,507,101 B1 * | 1/2003 | Morris | H01L 23/4006 257/659 |
| 2012/0127578 A1 * | 5/2012 | Bright | G02B 1/116 359/585 |

* cited by examiner

*Primary Examiner* — Richard Kim
(74) *Attorney, Agent, or Firm* — Brian Furrer

(57) ABSTRACT

A display device for displaying information to a user in correspondence with a display signal. The display device includes an LCD receiving the display signal and displaying information in accordance with the display signal. The display device additionally includes a capacitive touch panel having an electrically conductive surface. The capacitive touch panel provides a signal corresponding to the location of an object touching or placed in close proximity to the surface of the capacitive touch panel for providing user input. A chassis supports the LCD and capacitive touch panel in the device. A capacitor capacitively connects the electrically conductive surface of the capacitive touch panel to the chassis.

8 Claims, 5 Drawing Sheets

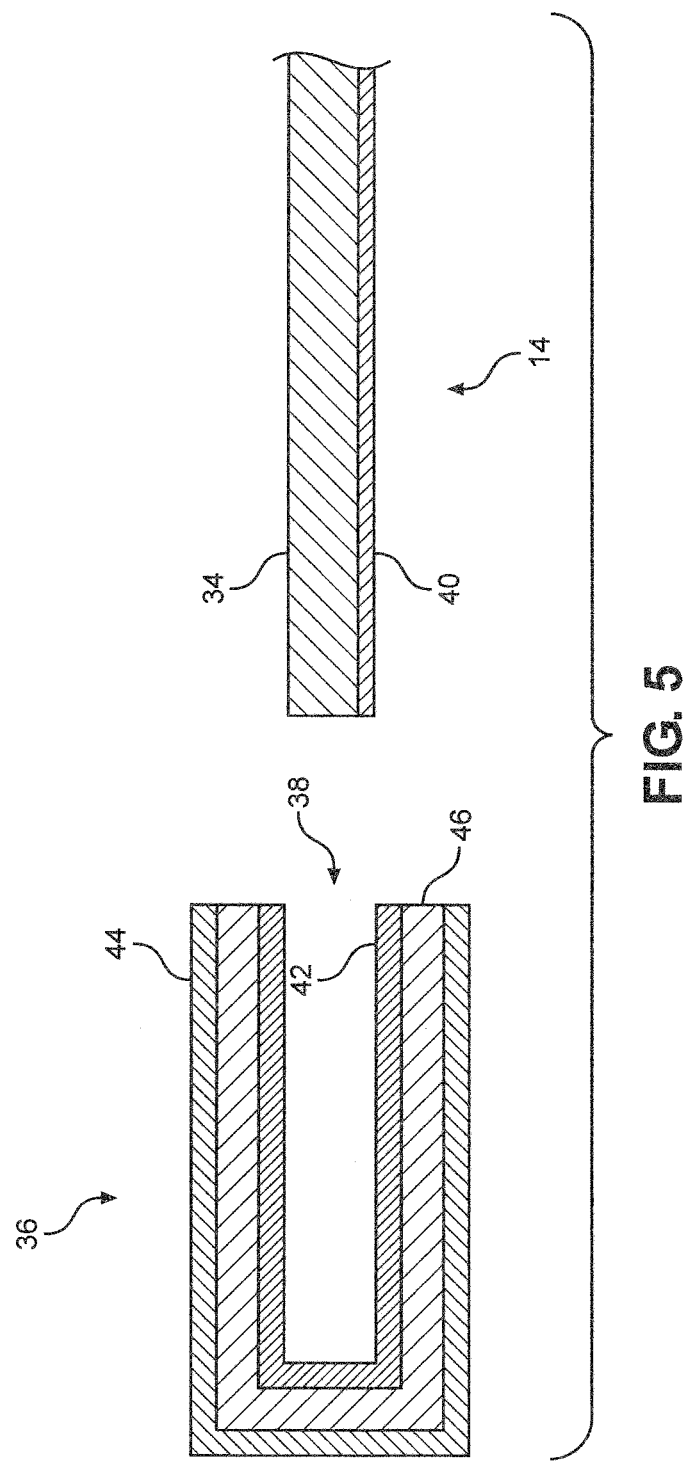

DISPLAY DEVICE

CROSS-REFERENCE TO RELATED APPLICATIONS

The present application is a divisional application of non-provisional U.S. application Ser. No. 14/040,384, Filed Sep. 27, 2013, which in turn claims priority from prior U.S. provisional application Ser. No. 61/718,304, filed Oct. 25, 2012. Priority is hereby expressly claimed and the disclosure of each of the foregoing provisional and non-provisional applications is incorporated herein by reference in its entirety and for all purposes.

TECHNICAL FIELD

The present invention relates to suppressing radiation of electromagnetic interference, and more particularly to suppressing radiation of electromagnetic interference from a display device.

BACKGROUND

Most electronic devices emit some electromagnetic inference radiation. For devices having a display, a significant amount of the interference passes through the display. In modern devices, the display is usually a liquid crystal type due to light weight, thinness, and low power consumption. Prior art methods have attempted to suppress electromagnetic interference radiation emission through the display by providing a suppression sheet or coating over the display. The suppression sheet or coating is typically formed of a substantially transparent electrically conductive material. The conductive material is electrically connected to the chassis or case for the electronic device, which suppresses or attenuates the emission of interference radiation through the display. As the suppression sheet or coating is substantially transparent, viewing of the display is largely unhindered.

While satisfactory for some purposes, there has been an increasing trend toward use of touch sensitive displays. The preferred technique for providing touch sensitive functionality has recently been to use capacitive sensing techniques. Capacitive sensing permits the sensing of multiple simultaneous touches for a wider range of inputs from a user. Unfortunately, using a conductive transparent conductive sheet or coating to suppress electromagnetic interference through the display tends to adversely impact capacitive sensing.

Regulations pertaining to aircraft generally impose the most stringent requirements for the level of electromagnetic interference that can be permissibly emitted by a device. There are two areas of the electromagnetic spectrum that tend to be problematic for electromagnetic emissions from electronic devices in aircraft. The first is the very high frequency range (VHF), reserved for pilot communication. The second is the frequency range reserved for the global positioning system (GPS).

The present invention addresses the problem of suppressing electromagnetic interference from an electronic device.

SUMMARY OF THE INVENTION

In one aspect, a method for suppressing radiation of electromagnetic interference from a display device is provided. The display device includes a liquid crystal display and a capacitive touch panel in which the capacitive touch panel is supported by a frame or chassis and the capacitive touch panel includes an electrically conductive surface.

The method includes determining a frequency for which it is desired to provide a greater amount of suppression of electromagnetic interference from the display device. For example, there may be a frequency that is causing the display device to fail a test for radiation of electromagnetic interference. Based upon the frequency that is causing the failure, a capacitive impedance corresponding to this frequency is determined. Thereafter a capacitor is provided having a capacitance corresponding to the determined capacitive impedance. This capacitor is then used to capacitively connect the electrically conductive surface of the capacitive touch panel to the chassis. If there is another frequency that is causing a failure as well, the foregoing steps are repeated for this another frequency and another capacitor provided. This another capacitor is used to capacitively connect the electrically conductive surface of the capacitive touch panel, in parallel with the other capacitor, to the chassis.

For a plurality of frequencies, such as a range of frequencies or where there are several problematic frequencies, the method includes determining the lowest frequency for which it is desired to provide a greater amount of suppression of electromagnetic interference from the display device. Based upon the foregoing lowest frequency, a capacitive impedance corresponding to the lowest frequency is determined. Thereafter a capacitor is provided having a capacitance corresponding to the determined capacitive impedance. This capacitor is then used to capacitively connect the electrically conductive surface of the capacitive touch panel to the chassis.

The capacitive touch panel includes an electrically nonconductive surface opposite the electrically conductive surface. In a more detailed aspect, the method includes providing the capacitor in the form of a strip of capacitive material. The strip is disposed to extend along the periphery of each of the electrically nonconductive surface and the electrically nonconductive surface. In a still more detailed aspect, the method includes bending the strip to correspond substantially to the shape of a capital letter U when viewed in a cross section.

In a further detailed aspect, the method includes determining the lowest frequency by testing the display device. The testing is to determine at which frequencies the display device fails to meet a governmental regulation for radiation of electromagnetic interference. The required capacitive impedance is based upon the reciprocal of the lowest frequency in radians per second determined to be problematic in testing the display device.

The strip of capacitive material forming the capacitor has a thickness and a dielectric constant. A total area for the strip is determined to provide the capacitive impedance corresponding to the lowest frequency, i.e., the required capacitance or capacitive impedance. The determination of the total area is based on at least the thickness and the strip dielectric constant. In addition, the determination takes into account the dielectric constant for air.

The capacitor includes two plates. In a more detailed aspect of the method, capacitively connecting the capacitor includes electrically connecting one plate of the capacitor to the electrically conductive surface of the capacitive touch panel. The other plate is electrically connected to the chassis.

In another aspect, a display device for displaying information to a user in correspondence with a display signal is provided. The display device includes a liquid crystal display receiving the display signal and displaying information in correspondence therewith. The information includes images and text.

The display device additionally includes a capacitive touch panel having an electrically conductive surface. The capacitive touch panel provides a signal corresponding to the location of an object placed in contact or proximity with the surface for providing input from the user. The display device further includes a chassis supporting the liquid crystal display and the capacitive touch panel. The display device includes as well a capacitor capacitively connecting the electrically conductive surface of the capacitive touch panel to the chassis. In a further detailed aspect, the capacitive touch panel is electrically connected to the chassis substantially only through the capacitive connection.

Without the capacitor capacitively connecting the capacitive touch panel to the chassis, electromagnetic interference radiation emanates at a level exceeding a government regulation. In a yet more detailed aspect, the capacitance of the capacitor corresponds to the reciprocal of the lowest frequency in radians per second of the foregoing electromagnetic interference radiation.

The capacitive touch panel includes a peripheral edge. The capacitor is formed of a length or strip of capacitive material disposed along the peripheral edge of the capacitive touch panel. There may be a plurality of capacitors each capacitively connecting the capacitive touch panel to the chassis. The total combined capacitance or capacitive impedance of the plurality of capacitors corresponds to the reciprocal of the lowest frequency in radians per second of the electromagnetic interference radiation.

Each capacitor has opposing plates spaced apart from one another by a dielectric. One of the plates directly contacts the electrically conductive surface of the capacitive touch panel. The other plate is electrically connected to the chassis. In an alternate embodiment, the plate is electrically connected to the conductive surface of the capacitive touch panel, but is not in direct contact.

The foregoing aspects provide advantages. In this regard, it suppresses radiation of electromagnetic interference without substantially degrading performance of the capacitive touch panel. Higher frequency radiation tends to pass easily through the capacitive connection to the chassis and is thus attenuated. In contrast, lower frequencies do not pass through the capacitive connection as easily and capacitances induced on the capacitance touch panel by proximity or contact with an object are not shorted out.

Other aspects and advantages will become apparent from the following description, taken in conjunction with the accompanying drawings, illustrating by way of example the principles of the invention.

BRIEF DESCRIPTION OF THE DRAWINGS

The drawing figures are not necessarily to scale and do not represent every feature, but are diagrammatic to enable those of ordinary skill in the art to make and use the invention without undue experimentation and do not limit the scope of the claims. Embodiments in accordance with the invention and advantages will therefore be understood those of ordinary skill in the art by reference to the detailed description below together with the following drawings figures, wherein:

FIG. 5 is a schematic, enlarged cross-sectional view of a U-shaped capacitor.

DETAILED DESCRIPTION

Figure 1:
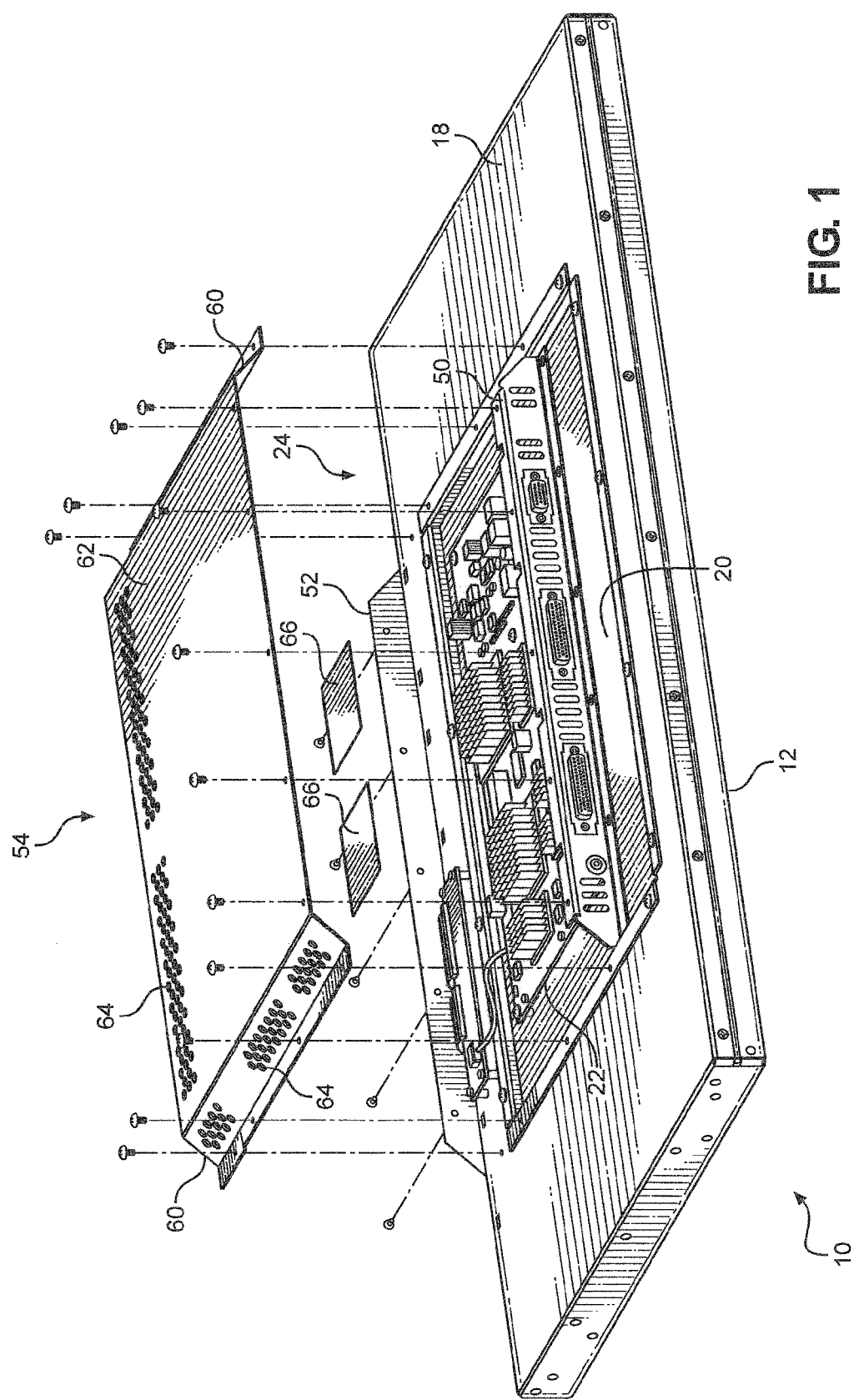
FIG. 1 is a perspective, partially exploded view of a display device.

FIG. 1 illustrates a perspective, partially exploded view of a display device indicated generally by reference numeral 10 in accordance with the present invention. The display device 10 includes a viewing area for displaying information to a user. In FIG. 1, the display device 10 is illustrated with the viewing area facing downward for more convenient explanation. In use, the display device 10 displays information on the viewing area in accordance with display signals. The information includes both images and text.

Figure 2:
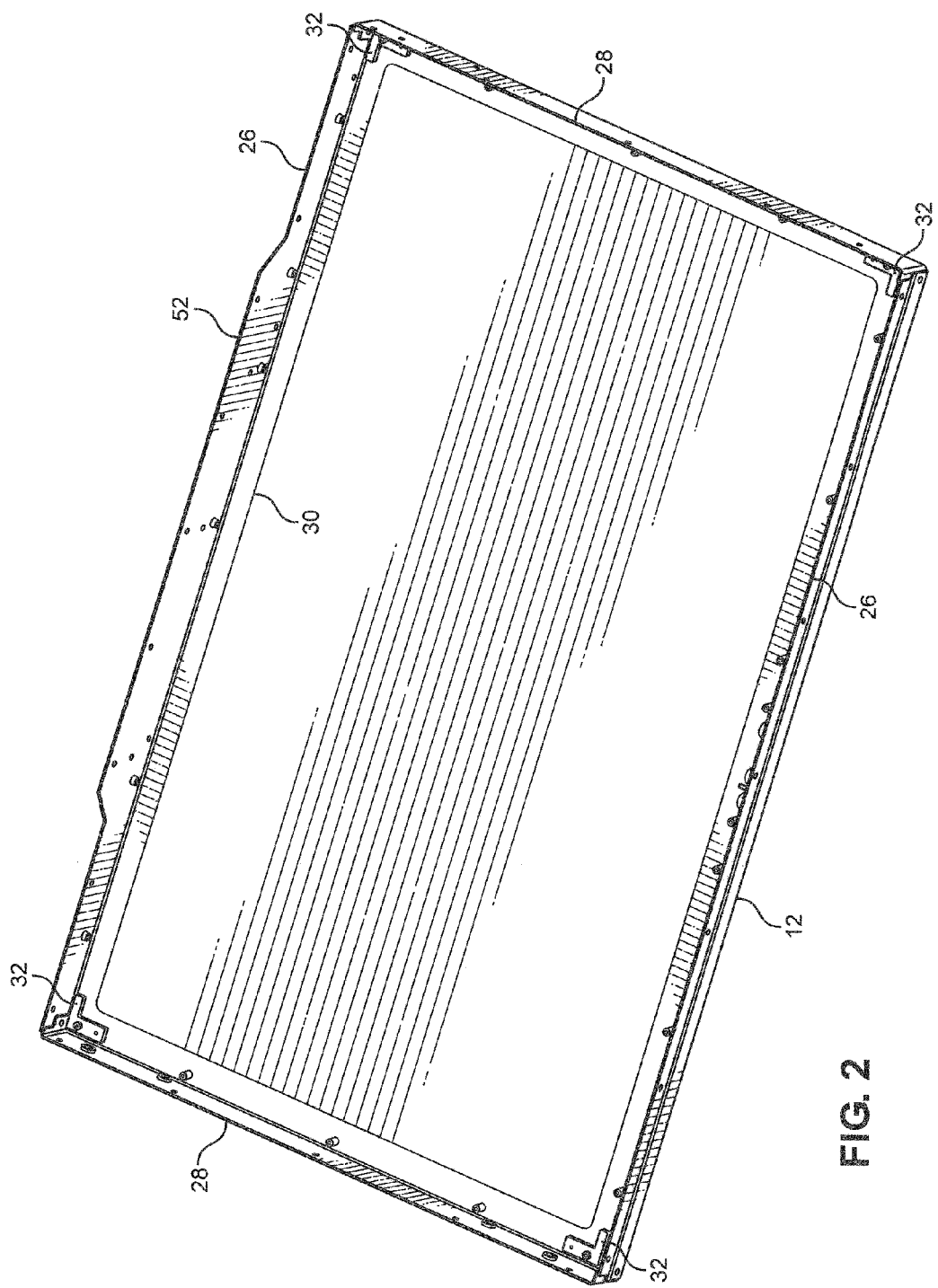
FIG. 2 is a perspective view of a frame or chassis of the display device of FIG. 1.
Figure 3:
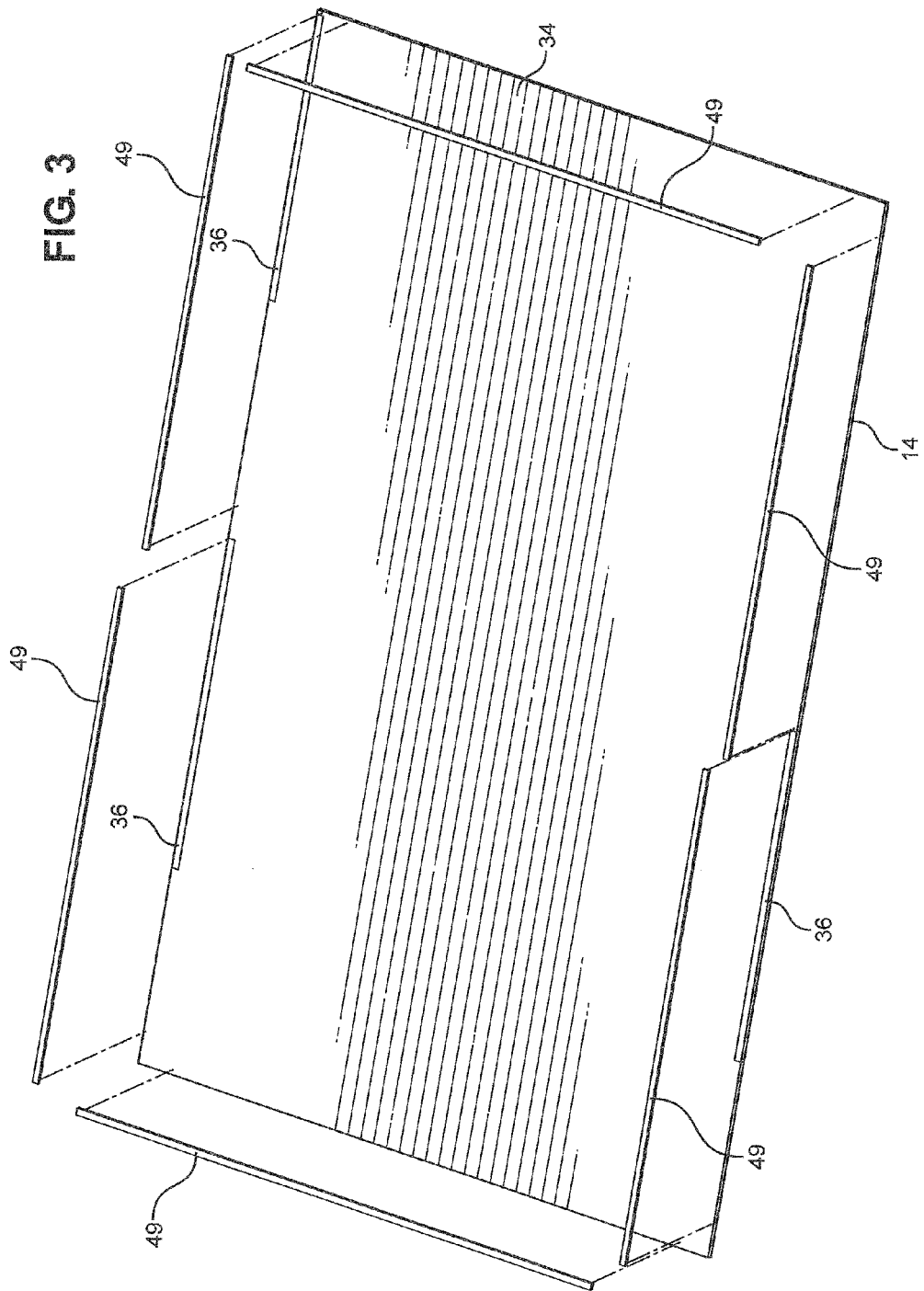
FIG. 3 is a perspective view of a capacitive touch panel of the display device of FIG. 1, showing U-shaped capacitors disposed thereon and the application of adhesive backed conductive strips.
Figure 4:
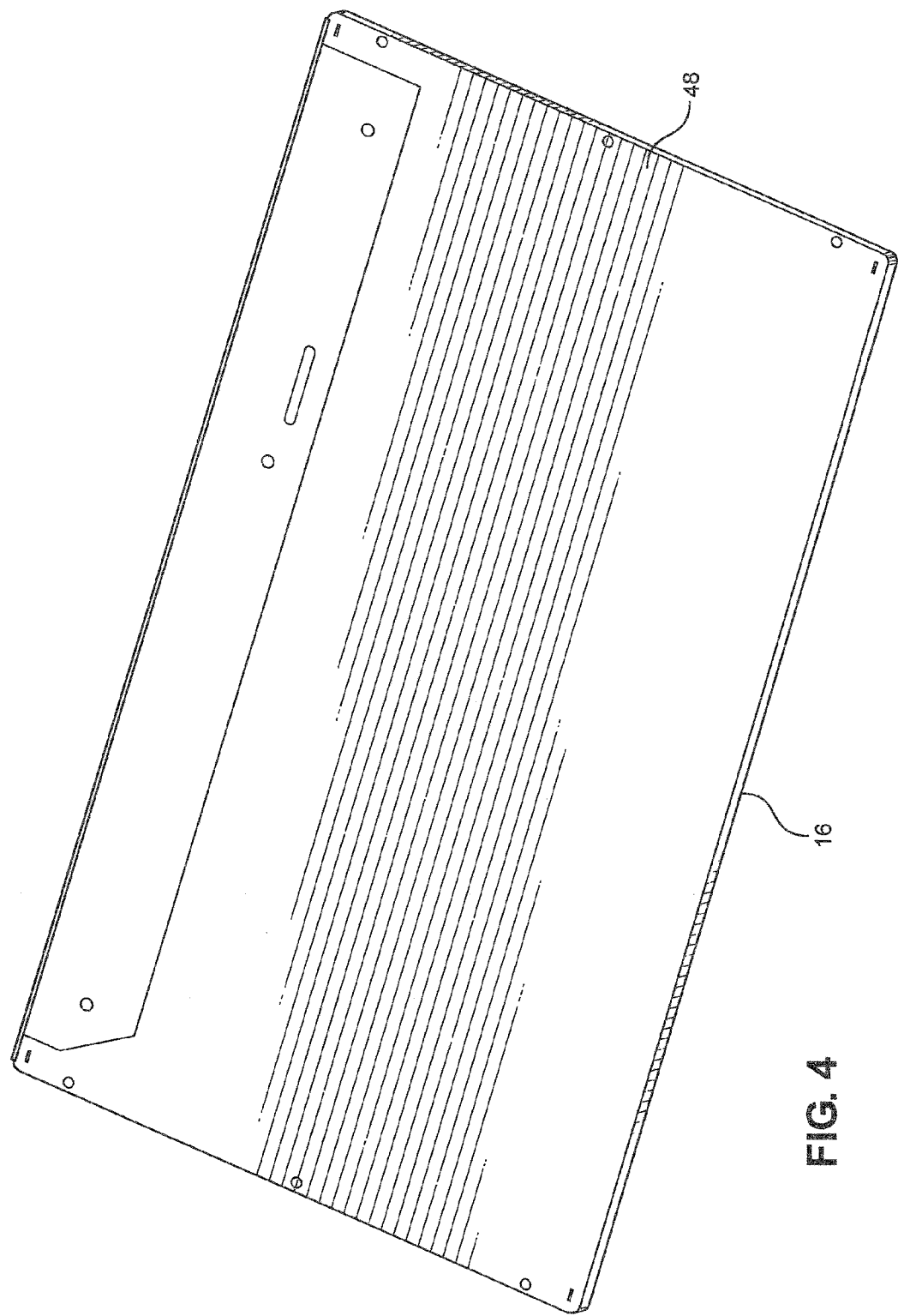
FIG. 4 is a perspective view of the non-viewable side, i.e., back side, of a liquid crystal display of the display device of FIG. 1.

With reference to FIGS. 2, 3 and 4 respectively, the display device 10 includes a frame or chassis 12, a capacitive touch panel 14, and a liquid crystal display 16. For more convenient reference the liquid crystal display 16 is hereinafter referred to as an LCD 16. In the assembled display device 10, the frame or chassis 12 surrounds or frames the viewing area. The chassis 12 is illustrated in a perspective view shown removed from the display device 10 in FIG. 2, as is the capacitive touch panel 14 in FIG. 3 and the LCD 16 in FIG. 4.

When the display device 10 is assembled, the chassis 12 receives and supports the capacitive touch panel 14 (see FIG. 3). The chassis 12 additionally receives and supports the LCD 16 (see FIG. 4). In particular, the LCD 16 is placed behind the capacitive touch panel 14 in the chassis 12. More particularly, the capacitive touch panel 14 forms an exterior surface in the assembled display device 10, with the LCD 16 arranged behind the capacitive touch panel 14. When the display device 10 is operated, information as described previously is displayed on the LCD 16 in the form of text and images. To view the information, one looks through the capacitive touch panel 14 to view the information displayed on the LCD 16. As described more fully below, the capacitive touch panel 14 is substantially transparent.

Returning to FIG. 1, a main cover plate 18 is placed behind the LCD 16 in the display device 10. With continued reference to FIG. 1, the main cover plate 18 includes a centrally disposed rectangular opening in which a support plate 20 is mounted. The support plate 20 provides a base or support to which a microprocessor board 22 mounts. The microprocessor board 22 includes electronics indicated generally by reference numeral 24. The electronics 24 receive display signals and output corresponding LCD display signals to the LCD 16, which causes the LCD 16 to display information in accordance with the display signals.

The electronics 24 are of conventional type for producing display signals for the LCD 16, such as those commonly used in information processing equipment. For example, the electronics 24 includes cabling, wiring, ports and jacks for communication of signals and electric power. The cabling and wiring communicates the signals and electric power to electronic components mounted on the microprocessor board 22, such as integrated semiconductor chips for providing a memory and data processing, capacitors, resistors, inductors and other components conventionally used for signal processing and electric power use, such as filtering, amplifying, power smoothing and conversion. The electronics 24 further includes heat dissipation structures, such as fins and thermal pads for conducting waste heat away. Preferably, the electronics 24 and the LCD 16 are both designed to operate with the same input voltage, for example 28 volts DC. In an alternate embodiment including a computer as part of the display device 10, i.e., a "smart" display, the electronics 14 may include circuitry for receiving and transmitting signals for Internet communication or according to other protocols, with other information processing devices via either wired and/or wireless communication.

Returning to FIG. 2, the chassis 12 includes two longer walls 26 extending along the length of the chassis 12. The two longer walls 26 are spaced apart parallel to one another by two shorter walls 28 joining the ends of the longer walls 26 at substantially right angles. The walls 26 and 28 form an interior space approximately corresponding to the shape and length and width of the capacitive touch panel 14. The dimensions of the foregoing interior space of the chassis 12 are slightly larger than that of the capacitive touch panel 14 so that the capacitive touch panel 14 may be slid into the foregoing interior space without interference and having some tolerance between the sides of the capacitive touch panel 14 and the chassis 12.

The chassis 12 includes a lip 30 protruding at substantially a right angle from along one edge of each of the walls 26 and 28 toward the opposite wall. In particular, the lip 30 extends inward from around the interior periphery of the chassis 12 along the lower edge of each of the walls 26 and 28. More particularly, the lip 30 forms a rectangular opening having a length and width slightly smaller than that of the capacitive touch panel 14. When the display device 10 is assembled, the capacitive touch panel 14 is received in the chassis 12, with the lip 30 abutting and supporting the edges of the capacitive touch panel 14.

The chassis 12 is formed of an electrically conductive material, preferably of a lightweight metal alloy, such as an aluminum alloy. For providing additional structural strength, the chassis 12 may include brackets 32 disposed at the corners and/or other support structure. As illustrated, the walls 26 and 28 and lip 30 are formed separately and fastened together. In an alternate embodiment the chassis 12 could be produced with the walls 26 and 28 and the lip 30 as an integral unit.

With reference to FIG. 3, the capacitive touch panel 14 is of a conventional type available commercially, such as from GLOBAL PMX USA of Tustin, Calif. in the United States of America. The foregoing company is associated with GBG Advance of Taipei, Taiwan. The capacitive touch panel 14 is preferably in the form of a rectangular sheet or thin plate corresponding to the dimensions of the LCD 16. In the illustrated embodiment, a capacitive touch panel 14 was used from the foregoing company having a diagonal dimension of about 27 inches, which corresponds to the approximate size of the LCD 16 of the present embodiment.

Due to touch sensitive functionality provided by the capacitive touch panel 14, the display device 10 is convenient for use on a vehicle, i.e., a mobile environment. Specifically, the display device 10 does not require a mouse and hence there is no need to allow space for use of a mouse around the display device 10. Likewise, there is no need to allow for space for a track pad and thus the display device 10 may be more compact. Hence, it can be more conveniently mounted and used in a vehicle.

One type of highly regulated mobile environment is within the field of airline travel. Electronic devices used on aircraft must meet requirements limiting electromagnetic interface radiation. Hereinafter, electromagnetic interference is abbreviated as "EMI" for convenient reference. In the display device 10, there are three main sources of EMI radiation. First, the electronics 24, which tend to radiate EMI radiation in a frequency range from around 150 KHz to about 30 MHz. Second, circuitries included with the LCD 16 on the non-viewable side (backside) 48 thereof tend to cause emission of electromagnetic waves having a frequency range from approximately 100 MHz to around 6 GHz. Finally, the capacitive touch panel 14 also emits electromagnetic waves that may contribute to EMI radiation.

To suppress or attenuate the emission of EMI radiation, the display device 10 includes an EMI suppression film or coating on at least one surface of the capacitive touch panel 14. The suppression coating is a substantially transparent electrically conductive material. Preferably, the coating is formed of a substantially transparent conductive ceramic oxide, abbreviated hereinafter as "TCO". Such TCOs include indium-tin-oxide, indium-zinc-oxide, zinc oxide with or without dopants, for example, aluminum, gallium and boron, and other TCOs or combinations thereof. Of these indium-tin-oxide, hereinafter abbreviated as "ITO", is preferred. Capacitive touch panels with an ITO coating on at least one surface are commercially available, for example, from the aforementioned GLOBAL PMX USA.

The capacitive touch panel 14 in the present embodiment was obtained from GLOBAL PMX USA having an ITO coating on one side. The opposite side was not coated and therefore is substantially electrically nonconductive. In FIG. 3, the capacitive touch panel 14 is illustrated with the electrically nonconductive side 34 visible. That is, the electrically nonconductive side 34 is shown facing upward in FIG. 2, which is also substantially transparent. In the assembled display device 10, one looks through the non-conductive side 34 of the capacitive touch panel 14 toward the LCD 16.

The capacitive touch unit 14 is electrically connected to the chassis 12 through U-shaped capacitors 36. In the illustrated embodiment, three U-shaped capacitors 36 are shown. When viewed from the side, each of the capacitors 36 generally corresponds to the shape of a capital letter U. In use, each of the U-shaped capacitors 36 receives an edge of the capacitive touch panel 14. FIG. 5 schematically illustrates an exploded cross-sectional view of one of the U-shaped capacitors 36 and a portion of the capacitive touch panel 14. The channel 38 formed by the U-shape of the capacitor 36 receives the edge of the capacitive touch panel 14 therein. When the edge is received in the channel 38 of the U-shape of the capacitor 36, the upper and lower surfaces 34 and 40 of the capacitive touch unit 14 each respectively abut opposing portions of the surface 42 of the channel 38 of the capacitor 36. This arrangement is employed for mounting each of the capacitors 36 to the capacitive touch panel 14.

The surface 42 of the channel 38 of each capacitor 36 is formed of an electrically conductive material, preferably a copper alloy. When the capacitor 36 receives an edge of the capacitive touch unit 14 in the channel 38, the electrically conductive material contacts the ITO coating, i.e., the lower surface 40, of the capacitive touch panel 14, and is electrically connected thereto. The outer surface 44 of each capacitor 36 is also formed of an electrically conductive material, preferably the same as that of the material forming the surface 42 of the channel 38. The surfaces 42 and 44 of each capacitor 36 are electrically insulated from one another by a dielectric layer 46. The two surfaces 42 and 46 form two conductive plates opposing one another across the dielectric layer 46, which insulates the plates from one another. One plate electrically connects to the conductive side 40 of the capacitive touch panel 14. The other plate electrically connects to the chassis 12.

The capacitor plate electrically connected to the conductive side 40 of the capacitive touch panel 14, makes the electrical connection by direct contact with the electrically conductive surface or side 40 of the capacitive touch panel 14. In alternate embodiments, the contact could be made by indirect connection through another conductor. The other capacitor plate electrically connects to the chassis 12 indirectly through another conductor as described below.

The material forming the capacitors 36 is commercially available for example, from KCA Electronics of Anaheim, Calif. in the United States of America. The material is generally employed for use with circuit boards. To produce the capacitors 36, the material is purchased in a sheet and cut and into lengths or strips. Each strip is applied to the edge of the capacitive touch panel 14 and folded or bent so that the legs of the U-shape of each capacitor 36 respectively extend along the sides 34 and 40 of the capacitive touch panel 14.

On the nonconductive side 34 of the capacitive touch panel 14, the leg of the U-shape of each capacitor 36 extending therealong is covered by an adhesive backed electrically conductive strip 49. The adhesive backed electrically conductive strips 49 extend along each edge of the capacitive touch panel 14 on the nonconductive side 34 of the capacitive touch panel 14. When the display device 10 is assembled, the capacitive touch panel 14 is placed in the chassis 12 with the adhesive backed electrically conductive strips 49 contacting the lip 30 of the chassis 12. In this arrangement, each capacitor 36 is electrically connected to the chassis 12 through at least one adhesive backed electrically conductive strip 49. The other side of each capacitor 36 is electrically connected to the capacitive touch panel 14 through the ITO coating side 40. Preferably, the interior of the chassis 12 remains unpainted for good electrical conductivity with the adhesive backed electrically conductive strips 49.

The capacitors 36 are sized to provide a minimum capacitance or capacitive impedance based upon the frequency of problematic EMI radiation obtained through prior testing. Specifically, the frequency is noted at which a display device is failing to meet requirements, such as regulations imposed by the Federal Aviation Administration or other regulatory agency. One or more frequencies may be problematic. To determine the minimum capacitance required, the lowest frequency is noted at which there is a failure to meet the applicable regulation without the use of the capacitors 36. The lowest frequency is used because capacitive impedance increases as frequency decreases. That is, the required capacitance increases as the frequency decreases. Hence, the minimum required capacitance corresponds to the lowest frequency requiring greater suppression to meet EMI radiation regulations.

The capacitive impedance corresponds to the reciprocal of the frequency in radians per seconds. In Formula (1) below, Z(c) is the capacitive impedance and f is the frequency in cycles per second (Hertz). Therefore, the factor $2*\Pi$ is necessary for conversion to radians per second as there are $2\Pi$ radians per cycle:

$$Z(c)=1/(2*\Pi*f) \quad (1)$$

Once the minimum capacitive impedance, Z(c), has been determined, the area for a capacitive connection is determined. As previously described, the capacitors 36 comprise strips or lengths of a capacitive material that is folded or bent into a U-shape around edges of the capacitive touch panel 14. One side 42 of each capacitor 36, i.e., the length or strip of capacitive material, electrically connects to the ITO coated surface 40 of the capacitive touch panel 14. The other side 44 of each capacitor 36 electrically connects to the chassis 12 through at least one adhesive backed electrically conductive strip 49. The total area of the capacitors or lengths 36 of capacitive material is determined based on Formula (2) below:

$$C=\zeta_0*\zeta_R*A/d \quad (2)$$

Wherein:
$Z_0$ is the dielectric constant of air;
$\zeta_R$ is the dielectric constant of the sheet from which the strips are cut;
A is the total combined area of the strips;
d is the thickness of the material from which the strips are cut; and
C is the capacitive impedance, i.e., Z (c) from Formula (1);

Everything is known in Formula (2) except for the area, A. Formula (2) is accordingly solved for the area, A. Thereafter, capacitors or lengths 36 of the capacitive material are cut in which the total combined area together of all the capacitors or lengths 36 corresponds to the area, A. Hence, the U-shaped capacitors 36 are formed by providing a capacitive strip having a thickness and a dielectric constant. The required total area for the strip is determined to provide the required capacitive impedance based on at least the thickness and the dielectric constant for the capacitive material, with the dielectric constant for air also being taken into account.

If the U-shaped capacitors 36 are not long enough to fully cover an edge of the capacitive touch panel 14 from one end to the other, the capacitors 36 are placed along the edges of the capacitive touch panel 14 near locations where the EMI radiation is more intense or problematic. In the illustrated embodiment, three capacitors 36 are employed. In alternative embodiments, more or fewer capacitors 36 may be provided to meet circumstances as required for a particular application. If the capacitors 36 are too long for a capacitive touch panel 14, such as for a small display device 10, a capacitive material with a different dielectric is used or one having a greater thickness to form capacitors 36 having shorter length and providing the required capacitance or capacitive impedance. Generally, EMI radiation suppression tends to become more problematic as the size of the display device 10 increases.

When the capacitive touch panel 14 is electrically connected to the chassis 12 through the ITO coating without an intervening capacitance, a Faraday cage effect is produced that suppresses EMI radiation. However, the performance of the capacitive touch panel 14 is degraded because capacitances tend to be shorted out and it is more difficult to determine the location of an object touching the capacitive touch panel 14. The present embodiment in contrast provides a capacitive connection, i.e., the capacitors 36, between the chassis 12 and the ITO coating side 40 of the capacitive touch panel 14. The combined capacitance of the capacitors 36 corresponds to the capacitive impedance determined by using Formulas 1 and 2.

The capacitive connection tends to allow higher frequencies to pass therethrough with little impedance to thereby suppress EMI radiation. However, lower frequencies cannot pass through as easily and hence performance of the capacitive touch panel 14 is not degraded as much, resulting in a display device 10 meeting applicable regulations for limits on EMI radiation and having improved performance for touch sensitivity.

As discussed earlier, the LCD 16 is placed behind the capacitive touch panel 14. In the assembled display device 10, a user therefore looks through the capacitive touch panel 14 to see information displayed on the LCD 16. The information includes both images and text. The LCD 16 displays the information to a user when compatible display signals and power are input into the LCD 16. The LCD 16 may include adjustable backlighting for improved viewing of displayed information. The LCD 16 is of a standard type commercially available, for example from Chimei in Taipei, Taiwan. In the present embodiment a TFT LCD was used having a diagonal dimension of approximately 27 inches.

As discussed earlier, the LCD 16 has a non-viewable side 48, i.e., the backside 48. FIG. 4 illustrates the LCD 16 with the backside 48 facing upward. The opposite or display side of the LCD 16 is placed in the chassis 12 behind the capacitive touch panel 14 facing toward the capacitive touch panel 14 using a conventional mounting arrangement. That is, the display side of the LCD 16 faces toward the side 40 of the capacitive touch panel 14 having the ITO coating. A cushion strip may be disposed between the edges of the capacitive touch panel 14 and the LCD 16 for vibration reduction.

Referring to FIG. 1, the main cover plate 18 is placed behind the LCD 16. That is, the main cover plate 18 faces the backside 48 of the LCD 16. As described earlier, the main cover plate 18 includes a centrally disposed rectangular opening in which a support plate 20 is mounted. The support plate provides a support or base to which the circuit board 22 mounts having the electronics 24.

A connector plate 50 mounts to the support plate 20 and projects outward from the support plate at substantially a right angle. The connector plate 50 includes openings in which ports and jacks from the electronics 24 mount for connection to external cabling and wiring. The chassis 12 includes a vertical wall 52 extending substantially parallel to the connector plate 50. The outer periphery of the vertical wall 52 substantially corresponds in shape to the connector plate 50. In the assembled display device 10, the electronics 24 are enclosed on one side by the vertical wall 52 projecting from the chassis 12 and on the opposite side by the connector plate 50. The remaining two sides of the electronics 24 are each enclosed by a leg 60 of a rear cover plate indicated generally by reference numeral 54.

In particular, the rear cover plate 54 includes a back wall 62. In the assembled display device 10, the back wall 62 opposes the electronics 24. The legs 60 extend symmetrically from opposite edges of the back wall 62 at an angle. The rear cover plate 54 includes a plurality of ventilation holes 64 formed in the legs 60 and the back wall 62 to aid in heat dissipation from the electronics 24. Thermal insulation sheets 66 are disposed on the interior of the back wall 62 facing heat dissipation structure of the electronics 24 to prevent localized overheating of the back wall 62.

Preferably the rear cover plate 54 is formed integrally from a single piece of a lightweight metal alloy, such as an aluminum alloy. In the illustrated embodiment screws 68 are used to mount and hold the rear cover plate 54 in place. Screws 68 are also used to mount and hold other components in place, such as the support plate 20 and the main cover plate 18. Conventional spacers, fasteners, and other structures are disposed during assembly to secure the various components in the display device 10 and reduce vibration for use in mobile applications. As this will be understand by those of ordinary skill in the art, description of such conventional components is omitted for brevity. Likewise, description of electrical cabling and wiring between the electronics 24 and the LCD 16 and capacitive touch panel 14 have been omitted for the same reason.

It is possible that there are only one or two frequencies that are problematic. For example, the concern may be with a frequency used for radio communication or GPS. For instance, due to governmental regulations, the display device 10 may fail passing an EMI radiation test at the frequency used for radio communication. In this situation, a capacitive impedance is determined corresponding to the frequency at which the failure occurred. A capacitor 36 having a capacitance corresponding to the foregoing capacitive impedance is thereafter used to capacitively connect the electrically conductive surface of the capacitive touch panel 14 to the chassis 12.

There may also be a failure at another frequency, such as that used for GPS. In this situation, a capacitive impedance corresponding to this another frequency is determined. Thereafter, another capacitor 36 having a capacitance corresponding to the capacitive impedance for this another frequency is used to capacitively connect the electrically conductive surface of the capacitive touch panel, in parallel with the other capacitor 36, to the chassis 12.

Various changes and modifications can be made to the described embodiments without departing from the spirit and scope of the invention as will be recognized by those of ordinary skill in the art. For example, instead of using capacitors 36 formed into a U-shape as described earlier, capacitors of other shapes could be employed. For instance, strips of a capacitive material could be disposed only on the nonconductive side 34 of the capacitive touch panel 14 to form capacitors having a flat shape, rather than a U-shape. Conductive foil could be used to electrically connect one side of each capacitor to the ITO side 40 of the capacitive touch panel 14. The other side of each capacitor would electrically connect to the chassis 12 as described previously.

Alternatively, one or more capacitors of a typical conventional shape could be used in other embodiments to provide at least the minimum required capacitance or capacitive impedance. That is, capacitors having a cylindrical shape or other geometry and providing a combined capacitance corresponding to the minimum required capacitive impedance as determined by using Formula (1). One terminal of each conventional capacitor would be electrically connected to the ITO side 40 of the capacitive touch panel 14. The other terminal would be electrically connected to the chassis 12. In alternative embodiments, a safety factor could be applied to the required minimum required capacitance as determined based upon Formula (1). In other embodiments, a thin, substantially transparent, scratch resistance sheet or coating could be applied to the nonconductive side 34 of the touch panel 14 for improved scratch resistance. Generally, capacitive touch panels do not require direct contact with an object to sense the location thereof and may sense the location when the object is in close proximity therewith, such as through a thin sheet for providing scratch resistance.

Since changes can be made as described, the present examples and embodiments are to be considered as illustrative and not restrictive and the invention is not to be limited to the details given herein, but may be modified within the scope and equivalence of the appended claims.

The invention claimed is:

1. A display device for displaying information to a user in correspondence with a display signal, the display device comprising:
   an LCD receiving the display signal and displaying information in correspondence therewith;
   a capacitive touch panel having an electrically conductive surface, the capacitive touch panel providing a signal corresponding to the location of an object placed in contact or proximity with the surface for providing user input;
   a chassis supporting the LCD and capacitive touch panel;
   a capacitor capacitively connecting the electrically conductive surface of the capacitive touch panel to the chassis.

2. The display device of claim 1, wherein the capacitive touch panel is electrically connected to the chassis substantially only through the capacitive connection.

3. The display device of claim 1, wherein without said capacitor capacitively connecting, EMI radiation emanates at a level exceeding a government regulation and the capacitance of the capacitor corresponds to the reciprocal of the lowest frequency in radians per second of the EMI radiation.

4. The display device of claim 3, wherein the capacitive touch panel includes a peripheral edge and the capacitor is formed of a strip of capacitive material disposed along the peripheral edge of the capacitive touch panel.

5. The display device of claim 4, wherein there are a plurality of capacitors capacitively connecting the capacitive touch panel to the LCD and the combined equivalent capacitance of the capacitors corresponds to the reciprocal of the lowest frequency in radians per second of the EMI radiation.

6. The display device according to claim 1, wherein the capacitive touch panel includes a peripheral edge and the capacitor corresponds in a cross-section substantially to that of a capital letter U having two legs in which the peripheral edge of the capacitive touch panel is received between the two legs.

7. The display device according to claim 1, wherein the capacitor has opposing plates spaced apart from one another by a dielectric and one of the plates directly contacts the electrically conductive surface of the capacitive touch panel and the other plate is electrically connected to the chassis.

8. The display device according to claim 7, wherein the capacitive touch panel is electrically connected to the chassis only through the capacitive connection.

* * * * *